United States Patent [19]
Klement

[11] Patent Number: 5,851,091
[45] Date of Patent: Dec. 22, 1998

[54] TOOL MOUNT WITH EJECTOR

[76] Inventor: Klaus-Dieter Klement, St.Mauri-Strasse 1, D-52428 Jülich, Germany

[21] Appl. No.: 783,259

[22] Filed: Jan. 14, 1997

[30]     Foreign Application Priority Data

Feb. 28, 1996 [DE] Germany ................. 296 03 602 U

[51] Int. Cl.$^6$ ................................................. B23B 31/02
[52] U.S. Cl. ........................ 409/232; 82/160; 279/2.02; 279/2.12; 408/239 R
[58] Field of Search .................................. 409/232, 233, 409/234; 279/2.02, 2.03, 2.11, 2.12, 86; 82/160, 161; 408/57, 238, 239 R

[56]     References Cited

U.S. PATENT DOCUMENTS

| | | | |
|---|---|---|---|
| 3,301,108 | 1/1967 | Heiner | 279/2.12 |
| 4,832,546 | 5/1989 | Petemkin | 408/239 R |
| 4,981,057 | 1/1991 | Von Haas et al. | 409/234 |
| 5,346,344 | 9/1994 | Kress et al. | 409/234 |

FOREIGN PATENT DOCUMENTS 0 528 262  2/1993  European Pat. Off. .

*Primary Examiner*—Daniel W. Howell
*Attorney, Agent, or Firm*—Herbert Dubno; Andrew Wilford

[57]     ABSTRACT

A tool mount for a tool holder having a tubular collar with an inwardly projecting rim has a shaft centered on an axis and formed with an axially centered main bore having an outer end formed as a seat complementarily engageable around the collar and a transverse bore crossing the main bore. An actuating bolt in the main bore has a head engaged in the collar in the seat and is formed with a transverse bore aligned with the shaft transverse bore. A retaining element is engageable between the bolt head and the holder rim and the bolt is axially displaceable between an inner position pressing the retaining element radially outward into locking engagement with the holder rim and an outer position with the retaining element retracted radially inward out of locking engagement with the holder rim. An ejector sleeve axially displaceable on the bolt in the bore is axially outwardly engageable with the holder collar in the seat. A setting rod rotatable in the transverse bores about a transverse axis perpendicular to the main axis is formed with a locking cam eccentric to the transverse axis and engageable with the bolt to displace same between its positions and an ejector cam eccentric to the transverse axis and engageable with the ejector sleeve to displace same outwardly against the holder collar on displacement of the bolt into the outer position.

10 Claims, 3 Drawing Sheets

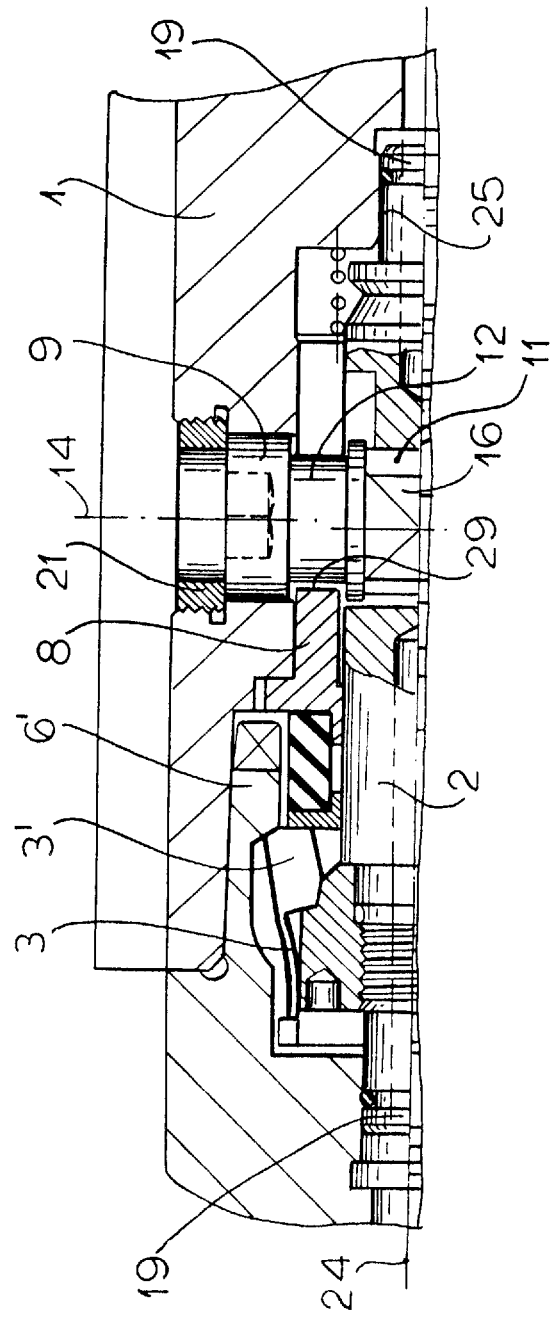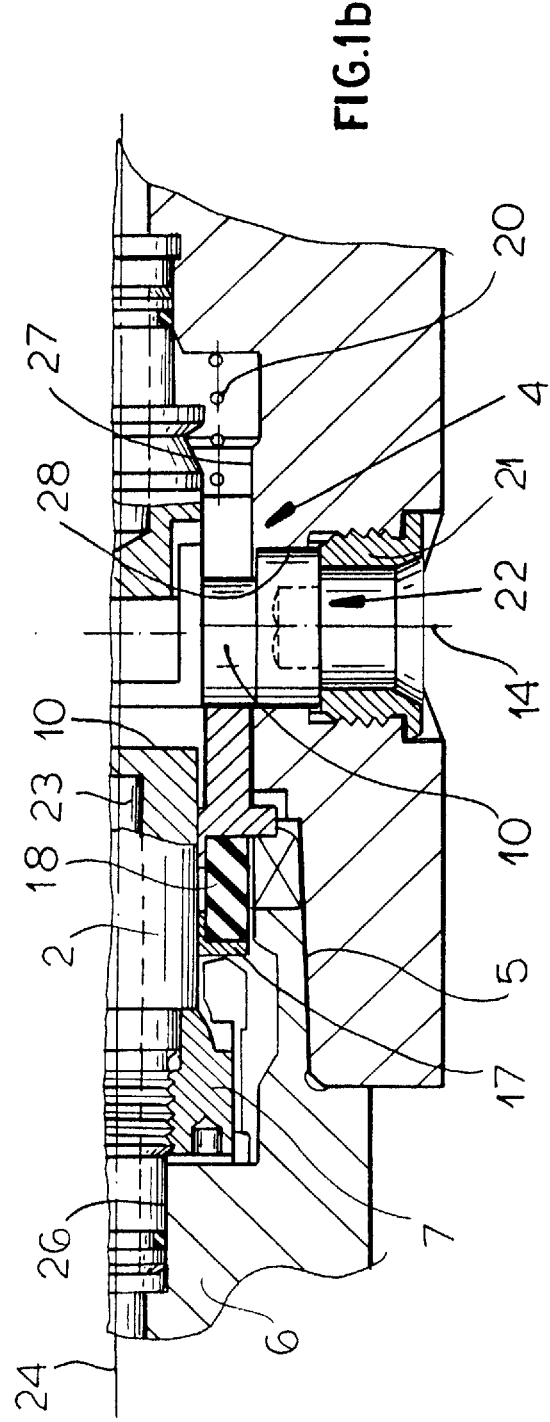
FIG.1a
FIG.1b

TOOL MOUNT WITH EJECTOR

FIELD OF THE INVENTION

The present invention relates to a tool mount. More particularly this invention concerns a device for securing a tool on a fixed or rotatable shaft or drive element.

BACKGROUND OF THE INVENTION

A standard tool mount for a tool holder having a tubular collar with an inwardly projecting rim has a shaft that may be rotatable about an axis and that is formed with an axially centered main bore having an outer end formed as a seat complementarily engageable around the collar. An actuating bolt in the main bore has a head engaged in the collar in the seat and a retaining element is engageable between the bolt head and the holder rim. The bolt is axially displaceable between an inner position pressing the retaining element radially outward into locking engagement with the holder rim and an outer position with the retaining element retracted radially inward out of locking engagement with the holder rim.

According to EP 0,528,262 of Engbergs the actuation system for the bolt is formed by an array of angled pins displaceable along respective axes extending at an acute angle to the main axis. Each pin has an inner end bearing on a frustoconical rim of the bolt and an outer end on a complementary surface of a nut threaded on the shaft. As the nut is screwed axially inward, the pins are moved in to draw in the bolt and lock the collar of the tool holder in the seat. When this nut is backed off it not only disengages from the pins so they can move outward and free the bolt, but it also engages the tool mount to break it free of the shaft.

While such a system is relatively effective, it is cumbersome to use. The nut must be rotated through several turns in each direction to lock the tool holder on the shaft and to free and eject it from the shaft.

OBJECTS OF THE INVENTION

It is therefore an object of the present invention to provide an improved tool mount.

Another object is the provision of such an improved tool mount which overcomes the above-given disadvantages, that is which is easy to use and simple in construction.

SUMMARY OF THE INVENTION

A tool mount for a tool holder having a tubular collar with an inwardly projecting rim has according to the invention a shaft centered on an axis and formed with an axially centered main bore having an outer end formed as a seat complementarily engageable around the collar and a transverse bore crossing the main bore. An actuating bolt in the main bore has a head engaged in the collar in the seat and is formed with a transverse bore aligned with the shaft transverse bore. A retaining element is engageable between the bolt head and the holder rim and the bolt is axially displaceable between an inner position pressing the retaining element radially outward into locking engagement with the holder rim and an outer position with the retaining element retracted radially inward out of locking engagement with the holder rim. An ejector sleeve axially displaceable on the bolt in the bore is axially outwardly engageable with the holder collar in the seat. A setting rod rotatable in the transverse bores about a transverse axis perpendicular to the main axis is formed with a locking cam eccentric to the transverse axis and engageable with the bolt to displace same between its positions and an ejector cam eccentric to the transverse axis and engageable with the ejector sleeve to displace same outwardly against the holder collar on displacement of the bolt into the outer position.

The locking cam according to the invention is formed as a part-cylindrical surface centered on an axis offset from and parallel to the transverse axis and a generally planar flat extending parallel to the transverse axis and offset from the axis of the part-cylindrical surface by a distance shorter than a radius of curvature of the part-cylindrical surface. The bolt bore is elongated parallel to the main axis and formed with an axially outwardly directed abutment surface flatly engageable with the flat in the ejecting position. The ejecting cam is formed as a cylindrical surface centered on the axis of the part-cylindrical surface and is engageable in a direction parallel to the main axis with the ejector sleeve.

Thus with this system it is possible with a quarter or half turn of the setting rod to move between the locking and ejecting positions. Not only does such movement actuate the retaining element, but it also can serve to physically eject the tool holder from the seat of the shaft. The small offset—here 1.5 mm—between the axis on which the cams are centered and the rotation axis of the setting rod allows considerable force to be exerted with a small angular movement of the setting rod.

The sleeve in accordance with this invention is provided with an outer ring directly axially engageable with the retaining element and a spring element engaged between the outer ring and the sleeve. The ring and head define an annular space occupied in part by the retaining element. Thus moving the rod into the ejecting position positively displaces the retaining element into a releasing position out of contact with the holder collar.

The bolt has opposite ends formed centered on the main axis with pin extensions and the shaft and holder are formed centered on the axis with seats complementarily receiving the pin extensions. Thus this bolt is accurately guided in the shaft and holder, and a lubricant or the like can be pumped through an axially throughgoing passage of the bolt from the shaft to the tool holder.

In accordance with a further feature of this invention a spring is braced between the sleeve and the shaft and urges the sleeve axially outward toward the collar. Retaining rings fixed in the shaft transverse bore fix the rod against movement in the shaft parallel to the transverse axis. At least one end of the rod is formed with a tool-receiving recess.

BRIEF DESCRIPTION OF THE DRAWING

The above and other objects, features, and advantages will become more readily apparent from the following description, reference being made to the accompanying drawing in which:

FIGS. 1*a* and 1*b* are axial sections through the tool mount according to the invention in the holding and ejecting positions, respectively;

SPECIFIC DESCRIPTION

Figure 2A:
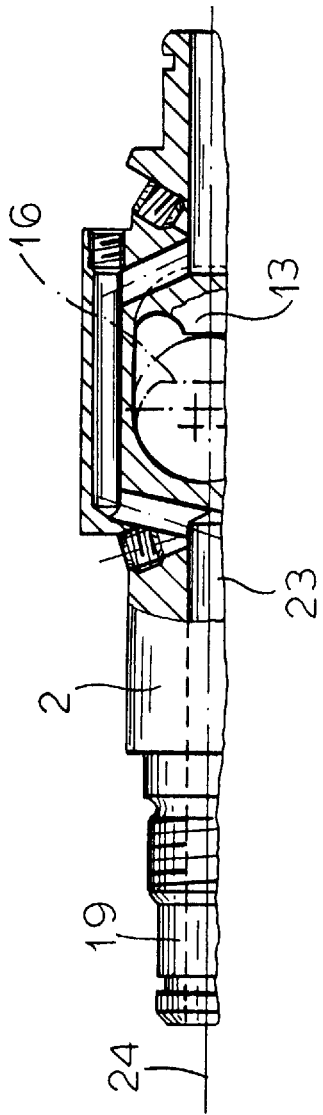
FIG. 2*a* is a side view partly in axial section through the actuating bolt in the holding position.
Figure 2B:
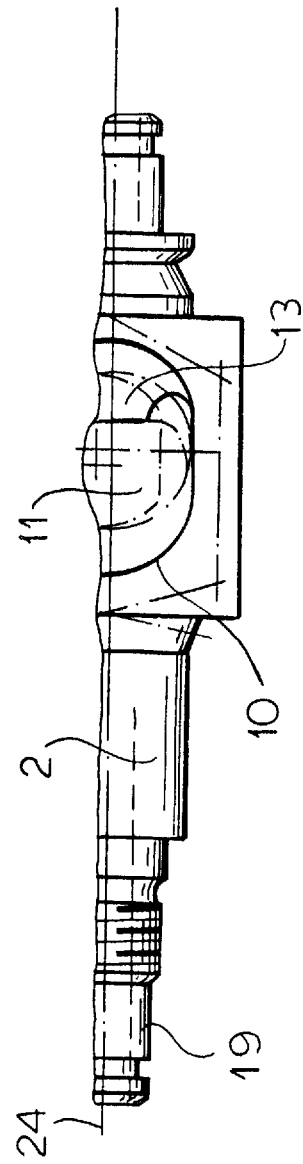
FIG. 2*b* is a side view through the actuating bolt in the ejecting position.
Figure 3:
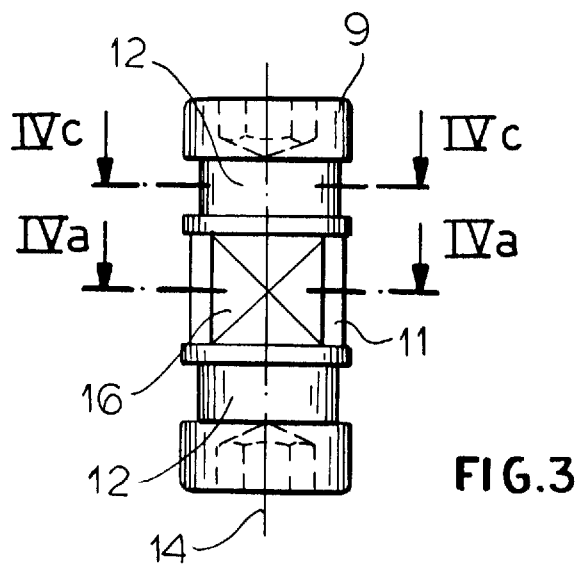
FIG. 3 is a side view of the operating rod.
Figure 4A:
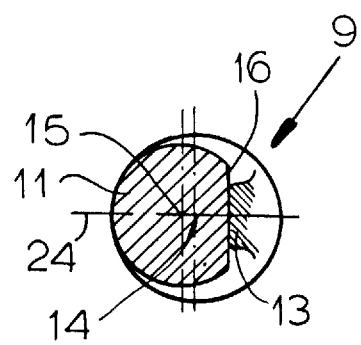
FIG. 4*a* is a section taken along line IVA of FIG. 3 of the bolt in the ejecting position.
Figure 4C:
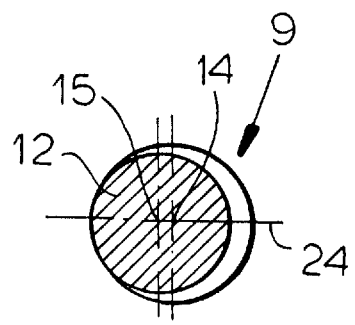
FIG. 4c is a section taken along line IVc of FIG. 3 of the bolt in the ejecting position.
Figure 4B:
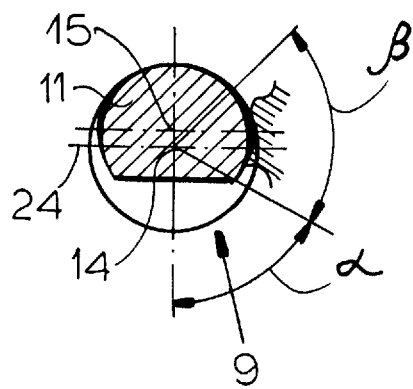
FIG. 4b is a view like FIG. 4a but with the bolt in the holding position.
Figure 4D:
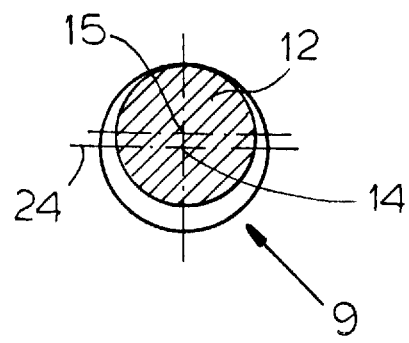
FIG. 4d is a view like FIG. 4c but with the bolt in the holding position.

As seen in FIGS. 1a and 1b a tool mount according to this invention comprises a shaft 1 centered on an axis 24 and formed centered on this axis 24 with a stepped bore 27 and with an axially outwardly open generally frusto conical recess or seat 5, the latter snugly holding a complementary collar 6' of a tool holder 6. The shaft 1 can be rotatable about the axis 24 or fixed. An actuating or pull bolt 2 also centered on the axis 24 is axially displaceable in the bore 27 of the shaft 1, with cylindrical ends 19 received in complementary bores 25 and 26 in the shaft 1 and holder 6. A sleeve-like coupling element 3 is limitedly axially displaceable on the bolt 2 and has segments 3' that can be locked between a frustoconical outer surface of a rim of the collar 6' and a ring forming a head 7 on the outer end region of the bolt 2. An ejector ring 17 axially slidable on the bolt 2 bears axially outward on the segments 3' and axially inward via an annular spring ring 18 on an ejector sleeve 8 axially slidable in the bore 27 on the bolt 2. A spring 20 is braced axially between the shaft 1 and the ejector ring or sleeve 8 to urge it axially outward.

According to the invention a setting mechanism 4 for the axial position of the bolt 2 is constituted mainly by a rod 9 journaled in a bore 28 in the shaft 1 centered on an axis 14 perpendicular to and intersecting the axis 24 and passing through a elongated-section transverse bore 10 formed in the bolt 2. Threaded rings 21 secure the bolt 9 axially in place and recesses 22 formed in its ends, for instance hexagonal-section seats, can be engaged by a standard tool to rotate the rod 9 about its axis 14. This rod 9 is centrally formed with a locking cam 11 that can displace the bolt 2 axially inward (to the right in FIGS. 1a and 1b) to spread the segments 3' and lock the holder 6 on the shaft 1 and with a pair of ejecting cams 12 flanking the cam 11 and engageable with the sleeve 8 to push the element 3 and holder 6 axially outward. A passage 23 (FIG. 2a) allows lubricant to be fed axially through the rod 2 to the area of the seat 5 and therefore to the tool holder 6.

More particularly as shown in FIGS. 3 and 4a through 4d, the locking cam 11 is formed mainly as a cylindrical surface with a center of curvature at an axis 15 parallel to but offset by about 1.5 mm from the axis 14 and a planar flat 16 extending parallel to the axes 14 and 15 but offset from the axis 15 by a shorter distance than the rest of the cam 11. The bolt 2 is formed in the bore 10 with an axial projection constituting a cam follower 13 having a flat surface extending in a plane perpendicular to the axis 24 so that it can fit flatly against the flat 16 in the ejecting position, with the bolt 2 in an axial outermost (furthest to the left in FIGS. 1a and 1b) position.

The ejecting cams 12 are formed as cylindrical surfaces centered on the axis 15 and bearing on axial inner end faces 29 formed on notches cut in the sleeve 8. Thus in the ejecting position when the axis 15 is in its axial outermost (furthest to the left in FIGS. 1a and 1b) position the ejector cams 11 thrust out the ejector sleeve 8 to push out the holder 6.

As the rod 9 moves through a first angle α of about 60° the bolt 2 is moved through a relatively great distance, During a subsequent movement through an angle β of about 75° the locking force is increased considerably,

I claim:

1. A tool mount for a tool holder having a tubular collar with an inwardly projecting rim, the mount comprising:
   a shaft centered on an axis and formed with
      an axially centered main bore having an outer end formed as a seat complementarily engageable around the collar and
      a transverse bore crossing the main bore;
   an actuating bolt in the main bore having a head engaged in the collar in the seat and formed with a transverse bore aligned with the shaft transverse bore;
   a retaining element engageable between the bolt head and the holder rim, the bolt being axially displaceable between an inner position pressing the retaining element radially outward into locking engagement with the holder rim and an outer position with the retaining element retracted radially inward out of locking engagement with the holder rim;
   an ejector sleeve axially displaceable on the bolt in the bore and axially outwardly engageable with the holder collar in the seat; and
   a setting rod rotatable in the transverse bores about a transverse axis perpendicular to the main axis and formed with
      a locking cam eccentric to the transverse axis and engageable with the bolt to displace same between its positions and
      an ejector cam eccentric to the transverse axis and engageable with the ejector sleeve to displace same outwardly against the holder collar on displacement of the bolt into the outer position.

2. The tool mount defined in claim 1 wherein the locking cam is formed as a part-cylindrical surface centered on an axis offset from and parallel to the transverse axis and a generally planar flat extending parallel to the transverse axis and offset from the axis of the part-cylindrical surface by a distance shorter than a radius of curvature of the part-cylindrical surface, the bolt bore being elongated parallel to the main axis and formed with an axially outwardly directed abutment surface flatly engageable with the flat in the ejecting position.

3. The tool mount defined in claim 2 wherein the ejecting cam is formed as a cylindrical surface centered on the axis of the part-cylindrical surface and is engageable in a direction parallel to the main axis with the ejector sleeve.

4. The tool mount defined in claim 1 wherein the ejecting cam is formed as a cylindrical surface centered on an axis offset from and parallel to the transverse axis and is engageable in a direction parallel to the main axis with the ejector sleeve.

5. The tool mount defined in claim 1 wherein the sleeve is provided with an outer ring directly axially engageable with the retaining element and a spring element engaged between the outer ring and the sleeve, the ring and head defining an annular space occupied in part by the retaining element.

6. The tool mount defined in claim 1 wherein the bolt has opposite ends formed centered on the main axis with pin extensions and the shaft and holder are formed centered on the axis with seats complementarily receiving the pin extensions.

7. The tool mount defined in claim 6 wherein the bolt is formed with a throughgoing passage extending between the pin extensions, whereby liquid can be pumped through the bolt from the shaft to the tool holder.

8. The tool mount defined in claim 1, further comprising a spring braced between the sleeve and the shaft and urging the sleeve axially outward toward the collar.

9. The tool mount defined in claim 1, further comprising retaining rings fixed in the shaft transverse bore and fixing the rod against movement in the shaft parallel to the transverse axis.

10. The tool mount defined in claim 1 wherein the rod has at least one end formed with a tool-receiving recess.

* * * * *